United States Patent [19]
Castro et al.

[11] 3,742,183
[45] June 26, 1973

[54] OPTICAL ELEMENT PROTECTION IN LASER APPARATUS

[75] Inventors: Rodolfo Castro, San Juan Capistrano; William J. Newton, Lakewood; Esteban J. Toscano, Oceanside; Felix Jerome Viosca, Canoga Park, all of Calif.

[73] Assignee: Hughes Aircraft Company, Culver City, Calif.

[22] Filed: Nov. 26, 1971

[21] Appl. No.: 202,422

[52] U.S. Cl. .................. 219/121 L, 350/63
[51] Int. Cl. .............................. B23k 9/00
[58] Field of Search ............... 219/121 L, 121 EB, 219/68, 384; 350/61, 63

[56] References Cited
UNITED STATES PATENTS
3,626,141   12/1971   Daly .................. 219/121 L
3,621,198   11/1971   Herbrich ............. 219/121 L
3,597,578   3/1971    Sullivan et al. ........ 219/121 L
3,601,576   8/1971    Schlafli .............. 219/121 LM
3,524,038   8/1970    O'Kelly, Jr. .......... 219/121 L
3,524,046   8/1970    Brouwer .............. 219/121 L
3,582,466   6/1971    Quirk ................. 219/121 L

OTHER PUBLICATIONS

"Welding at High Speed with the Carbon Dioxide Laser" Metal Progress Nov. 1970, pp. 59–61.
"Carbon Dioxide Applications" Technical Brochure of Coherent Radiation Laboratories August 1969.
"Carbon Dioxide Laser Welding" Welding Journal October 1969, pp. 800–806.

*Primary Examiner*—J. V. Truhe
*Assistant Examiner*—George A. Montanye
*Attorney*—W. H. MacAllister, Jr. and Joseph E. Szabo

[57] ABSTRACT

Debris produced by a laser cutter is kept out of the laser optics and is carried away by an airflow system which moves with the cutting beam.

4 Claims, 3 Drawing Figures

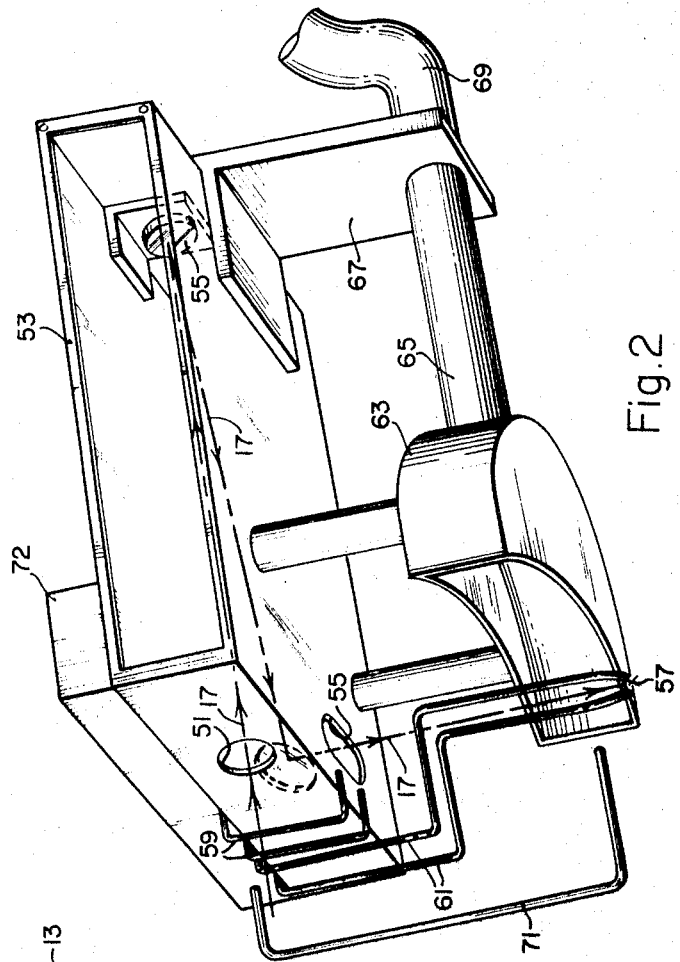
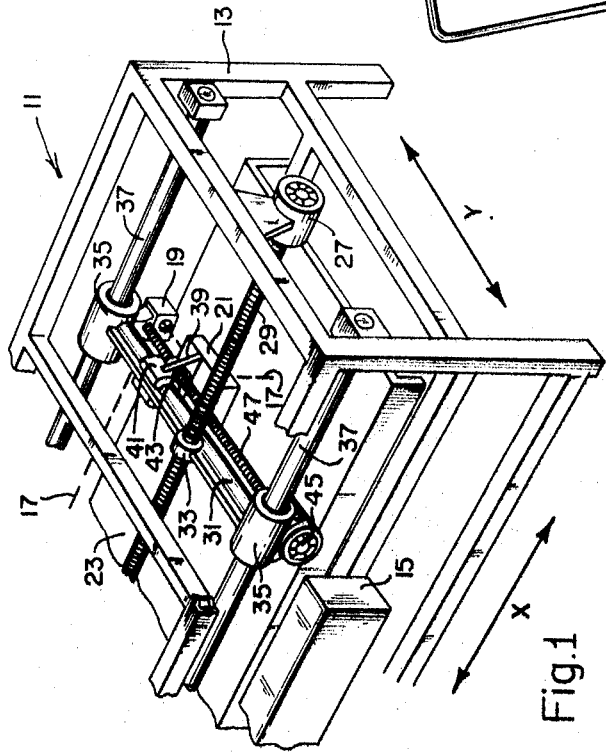
Fig.1  Fig.2  Fig.3

OPTICAL ELEMENT PROTECTION IN LASER APPARATUS

The present invention relates in general to apparatus in which material such as cloth is cut by a traveling laser beam and more particularly to a system for controlling the debris generated by the cutting operation and also to control the combustion which takes place during the cutting process.

In response to a long existing need for automated garment cutting, a new concept was introduced at Hughes Aircraft Company, assignee of the present invention, for cutting cloth rapidly and accurately. In accordance with this concept, material is cut into patterns by an accurately controlled traveling laser beam. Basically, the material is spread in a single layer onto a support surface movable through a cutting area within which a laser beam is made to travel over the material. The beam is focused at the level of the material and cuts through it cleanly by burning a narrow path therethrough.

Although discussed herein in order to illustrate the preferred use of the present invention, the overall laser cutter system is not the invention of Applicants and is not clained herein. Instead it is the invention of others by whom it was disclosed to Applicants and by whom an application will be filed thereon, and assigned to the assignee of the present invention.

A preferred technique for traversing the laser beam over the material to be cut is disclosed in the United States patent application entitled, "LASER CUTTER OPTICAL SYSTEM", Ser. No. 202,537, filed by William J. Newton, Rodolfo Castro and Howard R. Friedrich on Nov. 26, 1971, assigned to the assignee of the present invention and incorporated herein by this reference and now abandoned. As more fully disclosed in the referenced application, an unfocused beam is aimed along the length of the support surface at a first optical assembly which travels along the length of the support surface and which turns the laser beam 90° to its incoming initial direction by means of mirrors, causing it to travel across the width of the support surface. Taveling in synchronism with the first optical element is a second optical assembly which serves both to focus the incoming laser beam which it receives from the first optical assembly and also to change the beam's direction a second time, from its incoming direction across the width of the support surface to a final direction directed at the material lying on the support surface.

In addition to traveling in synchronism along the length of the cutting surface with the first optical element, the second optical assembly also travels toward and away from the first optical assembly, thereby making it possible to traverse the beam along the width as well as along the length of the support surface.

The second optical assembly, which serves to focus and redirect the laser beam, comprises an inlet window facing the first optical assembly to admit the laser beam reflected therefrom, and an outlet window facing the material support surface to permit the focused laser beam to emerge from the housing. Inside the housing, facing the inlet window, is a focusing mirror which, upon receiving the incoming unfocused laser beam from the inlet window, focuses it and reflects it back toward a second, plane, inclined mirror located above the outlet window, causing the focused beam to be reflected by the second plane mirror out through the outlet window toward the material to be cut.

In order to prevent damaging the material which is being cut, it is necessary to inhibit the tendency of the material to burst into flame. Additionally, in order to maintain the reflective optics in the housing of the optical assembly for losing their initial reflectivity, it is necessary to prevent the debris formed during the cutting process from entering the housing through the exit window which is usually located directly above the cutting point. Finally, not only is it desirable to keep the debris out of the optical assembly, it is also advantageous to remove that debris from the cutting area so that it will not deposit on the material which has been cut.

It is the principal object of the present invention to obtain the above objectives by means of a gas flow system.

In accordance with the invention, means are provided for directing a protective gas stream (typically, but not necessarily air) to flow across the exit opening of the housing to keep out the debris generated by the cutting operation. At the same time a quenching gas stream, which may also be air, is directed at the point of combustion generated by the laser beam. Optionally but desirably, means are also provided for drawing gases away from the point of combustion through a conduit which travels with the laser optics and it is a related feature of the invention that means are provided to direct a third gas stream to flow across the point of combustion and toward the conduit so as to blow the debris into the latter, from which it is then carried away by an exhaust hose connected to a suitable exhaust pump.

Other objects and advantages of the invention will become apparent from the following detailed description with reference to the drawings in which:

FIG. 1 is a perspective view of a portion of a laser cutting system incorporating features of the present invention;

FIG. 2 is a perspective view of an optical housing upon which there are mounted a set of gas-conveying tubes and an exhaust scoop for keeping debris out of the optical housing, to carry the debris away from the cutting area and to quench the flames which might otherwise result from the cutting operation; and FIG. 3 is a simplified schematic diagram of the system, to show connection of the various tubes to a source of pressurized gas, and also to show connection of the exhaust scoop to an exhaust pump.

An exemplary laser cutter incorporating features of the invention is illustrated in FIG. 1. Built on a frame 13, the laser cutter 11 includes a stationary laser source 15 extending along one side of the frame and generating a laser beam 17. A pair of optical devices (not shown) mounted at the rear end of the frame at opposite corners serve to change the direction of the laser beam 17 by 90° twice, causing it to approach the first of a pair of traveling optical assemblies 19 and 21, generally parallel to the right edge of the frame.

The traveling optical assemblies 19 and 21 are translated relative to a support surface 23 and material lying thereon by a transport 25 driven along the X direction by an electric drive motor 27 through a lead screw 29 which is operatively coupled to a transverse rail 31 through a drive nut 33. A pair of sleeve bearings 35 support the rail 31 slidably upon a pair of longitudinal guide rails 37 which extend along opposite sides of the frame 13 in the X direction. The first optical device 19 is attached directly to one of the sleeve bearings 35 and is located in line with the incoming laser beam 17. consequently, by forward or reverse rotation of the motor 27, the first optical device 19 may be caused to move along the X direction either toward or away from the rear of the frame 13. In order to keep the optical device 19 in the path 17 of the laser beam, the guide rail 37 is mounted exactly parallel thereto.

Movement of the second optical device 21 in unison with the first optical device 19 is effected by mounting it upon the rail 31. However, in order to permit the second optical device 21 also to move along the Y direction relative to the first optical device 19, this mounting is made by means of a bracket 39 having a sleeve bearing 41 at one end riding slidably upon the transverse guide rail 31. A drive nut 43 carried on the bracket 39 is driven by a second drive motor 45 through a lead screw 47 extending underneath and parallel to the transverse guide rail 31. Thus, the second optical device 21 may be moved relative to the first optical device 19 by forward or reverse operation of the motor 45. Since it is necessary that the second optical device 21 remain in the path of the laser beam 17 emanating from the first optical device 19, the transverse guide rail 31 and the lead screw 47 thereunder both extend parallel to that beam path portion.

As shown by the illustrated path of the laser beam 17, it is turned 90° by means of the first optical assembly 19, causing it to travel across the support surface 23, and is again turned 90°, toward the support surface 23, by the second optical assembly 21.

FIGS. 2 and 3 illustrate the second optical assembly 21 and the invention in greater detail. Referring to FIG. 2, after leaving the first optical assembly 19, the laser beam 17 enters the second optical assembly 21 through an inlet window 51 in the casing 53 of that assembly, which is shown with one of its walls removed. The incoming laser beam 17 first strikes a concave focusing mirror 55 located in the back of the casing opposite the inlet opening 51, from which it is then reflected onto a second, plane mirror (not shown) at the same end of the casing 53 as the opening 51 and to one side thereof. The plane mirror is inclined relative to the floor of the casing 53 (which may, for purposes of discussion, be assumed to be horizontal), the angle of inclination being such as to reflect the focused beam down and out through an exit opening 55.

By proper optical design of the mirror 55, the laser beam 17 is focused so as to have its greatest intensity at the point labeled 57 where the beam strikes the material to be cut (not shown). In accordance with the invention means are provided in the form of a pair of tubes 59 connected to a source 60 of pressurized gas (typically air) to maintain a continuously flowing gas curtain which covers the exit opening 55, thereby preventing debris created by the laser beam 17 at the cutting point 57 from entering the opening 55. It will be noted that it is the exit opening 55 rather than the entry opening 51 which is particularly susceptible to such entry of debris, by virtue of the fact that the opening 55 faces, and is directly above, the cutting point 57.

In further keeping with the invention, means are also provided, again in the form of a pair of tubes 61, for directing a flow of gas (which may again be air) at the cutting point 57, to quench the flames which might otherwise result from the cutting process. Preferably, although not necessarily, the quenching airstream is directed at opposite sides of the ignition point for more complete coverage.

In accordance with a third feature of the invention, means are also provided to carry away undesirable by-products, including gases as well as debris, from the cutting area around the ignition point 57. Such means include principally an exhaust scoop 63 having an arcuate mouth for maximum coverage of the area where the gases and debris are generated. The back of the scoop 63 is connected to a pipe section 65 which, along with the scoop 63, is carried on the casing 53 by means of a bracket 67. An exhaust hose 69 whose opposite end is connected to a suitable exhaust pump 70, which for example may be an industrial vacuum cleaner, is suitably supported so as to be able to follow the optical assembly 21. The effectiveness of the exhaust scoop 63 may be enhanced by providing a third means for directing gas (typically air) indicated by the tube 71 to blow the by-products of the burning process at point 57 toward the mouth of the scoop 63. If air is blown from all of the tubes 59, 61, and 71, they can all be supplied from a common manifold 72, as indicated in FIGS. 2 and 3. An air pressure of 50 psi has been found desirable at the manifold, and internal tube diameters of approximately one-sixteenth inch have been found sufficient to carry the air necessary to accomplish the desired function of the system.

From the foregoing it may be seen that a highly effective means has been provided for controlling the combustion process attending the cutting of material by a laser beam, not only preventing smoke and debris from entering and damaging the optical system used to direct the laser beam at the material, but also carrying away those by-products so that they do not settle on the material. This technique of localized control of ignition by-products by means of devices which travel with the traveling optical assembly 21 is effective not only if used as the sole means for removing combustion by-products and smoke, but also where additional exhaust means have been provided, as described in the United States patent application Ser. No. 184,139, entitled "MATERIAL HOLDING AND SMOKE REMOVAL SYSTEM FOR A LASER CUTTER," filed by Rodolfo Castro and Esteban J. Toscano on Sept. 27, 1971, assigned to the assignee of the present invention and incorporated herein by this reference. In the referenced patent application a laser cutter similar to that shown in FIG. 1 of the present application is shown enclosed in a chamber through which air is circulated, first above and across an air-permeable support surface and then under the surface and out of the chamber, serving both to hold the material which is to be cut upon the support surface and also to carry away smoke which has been generated during cutting. Particularly where such a system is provided for removing smoke and debris from the laser cutter, the exhaust portion of the system shown in FIGS. 2 and 3 of the present application comprising the pipe 71 and the exhaust scoop 63 may be omitted.

We claim:

1. In a system for directing a focused laser beam at a combustible material so as to cut it, the combination comprising:
   a. means for producing and projecting a laser beam;
   b. a housing spaced from said material and from said means, and having an opening as an inlet window for admitting said laser beam, at least one mirror facing said opening and mounted within said housing for redirecting and focusing said beam within said housing and toward said material, and an opening as an outlet window to allow said redirected and focused beam to leave said housing and reach said material; and c. means including a discharge orifice movable with said housing and located adjacent said outlet window for directing a gas stream to flow across said open outlet window, outside said housing, so as to maintain a curtain of air over said window, thereby to keep out waste particles produced when said focused laser beam reaches said combustible material.

2. The combination of claim 1 characterized further by means for directing a quenching gas stream at the area where said focused beam reaches said material.

3. The combination of claim 1 characterized further by means for maintaining gas flow away from said area so as to remove therefrom debris and smoke generated when said focused laser beam reaches said combustible material.

4. The combination of claim 1 characterized further by:

a. means including an additional discharge orifice for directing a quenching gas stream at the area where said focused beam reaches said material, and b. means for maintaining gas flow away from said area so as to remove therefrom debris and smoke generated when said focused laser beam reaches said combustible material.

* * * * *